United States Patent
Dharmadhikari et al.

(10) Patent No.: US 12,203,447 B2
(45) Date of Patent: Jan. 21, 2025

(54) METHOD FOR OPERATING A WIND TURBINE AND A WIND TURBINE

(71) Applicant: General Electric Renovables Espana, S.L., Barcelona (ES)

(72) Inventors: Parag Rameshchandra Dharmadhikari, Garching b. München (DE); Jeffrey Alan Melius, Salem, VA (US)

(73) Assignee: General Electric Renovables España S.L., Barcelona (ES)

( * ) Notice: Subject to any disclaimer, the term of this patent is extended or adjusted under 35 U.S.C. 154(b) by 0 days.

(21) Appl. No.: 18/075,821

(22) Filed: Dec. 6, 2022

(65) Prior Publication Data

US 2023/0175486 A1 Jun. 8, 2023

(30) Foreign Application Priority Data

Dec. 7, 2021 (EP) .................................... 21212854

(51) Int. Cl.
*F03D 7/02* (2006.01)
*H02P 9/02* (2006.01)
*H02P 101/15* (2016.01)

(52) U.S. Cl.
CPC ................. *F03D 7/028* (2013.01); *H02P 9/02* (2013.01); *F05B 2270/1033* (2013.01); *H02P 2101/15* (2015.01)

(58) Field of Classification Search
CPC ............................ F03D 7/028; F05B 2270/1033
See application file for complete search history.

(56) References Cited

U.S. PATENT DOCUMENTS

| 8,188,610 B2 | 5/2012 | Scholte-Wassink |
| 8,221,075 B2 * | 7/2012 | Nies ........................ F03D 80/40 416/1 |

(Continued)

FOREIGN PATENT DOCUMENTS

| CN | 111237139 A | 6/2020 |
| EP | 3015707 A1 | 5/2016 |

(Continued)

OTHER PUBLICATIONS

European Search Report Corresponding to EP21212854 on May 30, 2022.

*Primary Examiner* — Tulsidas C Patel
*Assistant Examiner* — Thomas K Quigley
(74) *Attorney, Agent, or Firm* — Dority & Manning, P.A.

(57) ABSTRACT

A method (1000, 1001) for operating a wind turbine (100-100d) is disclosed. The wind turbine includes a rotor (106) with rotor blades (108), a power conversion system (118, 210, 234) mechanically connected with the rotor (106), a first subsystem (310), a second subsystem (320), and an internal electric power distribution system (300-301b, 321, 322) connectable with the first subsystem (310) and the second subsystem (320). During operating (1100) the wind turbine (100-100d) in a normal operating mode in which the power conversion system (118, 210, 234) converts input motive power into electrical output power (P), the method (1000) includes detecting (1200) an increased power demand of the first subsystem (310), and actively increasing (1300) an amount (P1) of electric power (Pint) flowing through the internal electric power distribution system (300-301b, 321, 322) to the first subsystem (310) if a power demand of the second subsystem (320) is at least reduced.

13 Claims, 6 Drawing Sheets

(56) References Cited

U.S. PATENT DOCUMENTS

| | | | |
|---|---|---|---|
| 10,233,908 B2 | 3/2019 | Draper | |
| 10,458,396 B2 | 10/2019 | Philipsen et al. | |
| 10,830,215 B2 | 11/2020 | Zhao et al. | |
| 10,871,151 B2 | 12/2020 | Taillade et al. | |
| 2012/0133133 A1 | 5/2012 | Bager et al. | |
| 2014/0265329 A1* | 9/2014 | Jensen | F03D 7/028 290/44 |
| 2016/0236787 A1 | 8/2016 | Bourne et al. | |
| 2017/0218926 A1* | 8/2017 | Draper | F03D 13/20 |
| 2019/0032641 A1* | 1/2019 | Stoltenjohannes | F03D 7/0224 |
| 2019/0113025 A1 | 4/2019 | Badger et al. | |
| 2019/0264658 A1 | 8/2019 | Li et al. | |
| 2020/0124032 A1 | 4/2020 | Grunnet et al. | |
| 2020/0263671 A1 | 8/2020 | Xing | |
| 2020/0370540 A1 | 11/2020 | Arlaban Gabeiras et al. | |

FOREIGN PATENT DOCUMENTS

| | | |
|---|---|---|
| EP | 3165766 A1 | 5/2017 |
| EP | 3193013 A1 | 7/2017 |
| EP | 3530936 A1 | 8/2019 |
| EP | 3203066 B1 | 9/2019 |
| EP | 3189232 B1 | 10/2019 |
| EP | 3645880 A1 | 5/2020 |
| EP | 3708830 A1 | 9/2020 |
| WO | WO2017028843 A1 | 2/2017 |
| WO | WO2017190747 A1 | 11/2017 |
| WO | WO2018109016 A1 | 6/2018 |
| WO | WO2019144981 A1 | 8/2019 |
| WO | WO2019233251 A1 | 12/2019 |
| WO | WO2020038342 A1 | 2/2020 |
| WO | WO2020082652 A1 | 4/2020 |

* cited by examiner

METHOD FOR OPERATING A WIND TURBINE AND A WIND TURBINE

FIELD

The present subject matter relates generally to wind turbines having a rotor with several components and operating the wind turbines, in particular under cold (sub-zero) climate conditions and/or in in cold (sub-zero) regions.

BACKGROUND

Wind power is considered one of the cleanest, most environmentally friendly energy sources presently available, and wind turbines have gained increased attention in this regard. A modern wind turbine typically includes a tower, generator, gearbox, nacelle, and a rotor with one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The development of layer of ice on a surface of a rotor blade may negatively influence the performance of the respective wind turbine such, that an overall energy production is reduced. Furthermore, ice being present on a rotating rotor blade may as well cause additional loads and/or rotational imbalance, which subsequently may require a reduction of power generation and/or may result in a reduction of the lifetime of the wind turbine.

In the past, several counter measures were implemented in order to prevent generation of ice on surfaces of rotor blades. For example, wind turbines were equipped with hot air blowing arrangements which produce a hot stream of air being directed into an interior volume of the rotor blades. This led to an overall heating of the respective rotor blade causing ice present on an exterior surface of the rotor blade to melt and subsequently to fall off the rotor blade. Alternatively or in addition, heating arrangements including carbon heating mats may be applied to a skin of a rotor blade.

However, the additional, typically varying and/or large power requirements of the corresponding blade heating system/deicing system or components may pose challenges for the internal power supply of the wind turbine also supplying other components of the wind turbine required for (normal) operation, in particular respective components of the wind turbine's nacelle and rotor, respectively.

Accordingly, the present disclosure provides a method for operating a wind turbine, a wind turbine operated in accordance with the method, and a computer program product or a computer-readable storage medium with the operational method functions, as described herein.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine. The wind turbine includes a rotor having rotor blades, and a power conversion system mechanically connected with the rotor, a first subsystem, a second subsystem, and an internal electric power distribution system connectable with the first subsystem and the second subsystem. In a normal operating mode, in which the power conversion system converts input motive power into electrical output power, the method includes detecting an increased (electric) power demand of the first subsystem, and actively increasing an amount of electric power flowing through the internal electric power distribution system to the first subsystem if a (electric) power demand of the second subsystem is at least reduced.

This allows for supplying the first subsystem with a larger share of the electric power available from/via the internal electric power distribution system if the second subsystem can be operated at lower than rated power (without affecting the desired electrical output power of the power conversion system), for example in an idle mode or a standby mode.

Accordingly, the internal electric power distribution system may be designed for a lower maximum electrical output without affecting the energy supply of the subsystems during (normal) operation. Note that, due to the proposed control scheme, at most minor changes in the architecture of the internal electric power distribution system may be required.

Thus, costs and materials may be saved, and the ecological footprint of the wind turbine be reduced.

Note that the saving of costs and materials may be particularly high, if the internal electric power distribution system extends between the nacelle and the rotor. This is because the desired slip ring(s) between nacelle and rotor may be dimensioned smaller.

The amount of electric power flowing through the internal electric power distribution system to the first subsystem may follow a course of time. For example, the amount of electric power may first be ramped up to a first level (e.g. to a maximum level), thereafter at least substantially stay at the first level for a certain time period until it is ramped down to a second level, e.g. zero again. However, the course of time may also depend on the first subsystem.

Further, the course of time amount of the electric power flowing through the internal electric power distribution system to the first subsystem may at least partly be predetermined and/or be in accordance with a predefined parameterized curve (course of time of the electric power flowing through the internal electric power distribution system which depends on parameter(s), for example one or more predefined parameters).

Alternatively or in addition, the course of time of the amount of the electric power flowing through the internal electric power distribution system may also depend on measurement values and/or operating parameters of the first subsystem.

Even further, the actually used (e.g. the predetermined) parameter(s) may in addition be used for predicting the power availability and/or the power demand (of the first subsystem) for a forthcoming, e.g. next time period in which the amount of electric power flowing through the internal electric power distribution system to the first subsystem is to be increased again. Accordingly, a better management of the available power as well as the cater-able energy may be achieved.

The method steps as explained herein are typically performed by a control system for or even of the wind turbine. The control system is communicatively coupled with the power conversion system, the first subsystem, and the second subsystem, and typically implemented as a controller, for example a respective turbine controller.

Note that, the internal electric power distribution system is in particular connectable with the first subsystem and the second subsystem for supplying the first subsystem and the second subsystem with electric power.

More particular, the internal electric power distribution system may be connectable with the power conversion system for receiving electric power to be distributed to the first subsystem and the second subsystem. In this embodiment, the power conversion system may be considered as electric power source and the first and the second subsystems as respective electric power consumers and electric loads, respectively.

According to an embodiment, an increased amount of the electric power flowing through the internal electric power distribution system is used for heating at least one of the rotor blades.

More particular, the first subsystem may be configured to heat the blade foil(s) and/or includes or is implemented as a heating system for the blade(s).

For example, the heating system for the rotor blades (108) may include for each of the rotor blades a respective electric heating arrangement having at least one or a plurality of heating strips such as carbon mats (acting as heating resistors). Each heating arrangement may have two or even more portions. Further, the heating strips and/or portions of the respective heating arrangement may be located and/or mounted in/to the respective rotor blade.

Furthermore, the heating strips and/or portions of the respective heating arrangement may be separately connectable with the internal electric power distribution system, for example via respective switches. Accordingly, more heating strips and/or portions may be provided with electric power if the amount of electric power flowing through the internal electric power distribution system to the first subsystem and the heating system, respectively, is increased.

Alternatively or in addition, the heating system may include hot air blower(s) for heating the rotor blades from the interior.

In embodiments referring to a heating system as first subsystem, increasing the amount of electric power flowing through the internal electric power distribution system to the first subsystem may only be performed if an ambient temperature is below a given temperature threshold of typically 0° C. and/or if the ambient temperature decreases at a sufficiently fast (typically predetermined) rate at given humidity of ambient air.

Note that blade heating may also be done as a precautionary measure to avoid blade icing, for example if the risk of blade icing is estimated higher than a respective threshold of e.g. 50%, 75% or more typically 90%.

Alternatively or in addition, increasing the amount of electric power flowing through the internal electric power distribution system to the first subsystem may be done depending on an icing condition of the rotor blades.

In particular, the icing condition of the rotor blades may be monitored, and the amount of electric power flowing through the internal electric power distribution system to the first subsystem may be increased after and typically even depending on a result obtained by evaluating the icing condition of the rotor blades, such as a determined or estimated ice thickness and/or ice mass.

The second subsystem is typically operated at a higher priority compared to the first subsystem.

In one embodiment, the second subsystem includes or is implemented as a pitch system and/or is configured for a pitching at least one of the rotor blades.

During operating the wind turbine (in the normal operating mode), pitching has a higher priority compared to deicing and protection from icing.

In the normal operating mode, pitching may only be required from time to time, in particular in stable wind conditions. In the intervening period, the power demand of the pitching system is very low and at least close to a lowest value, respectively. Accordingly, a large fraction of the rated maximum power of the pitching system may be redistributed to the first subsystem (heating system) without affecting the functionality of the wind turbine.

In other words, the amount of electric power flowing through the internal electric power distribution system to the first subsystem may be increased if the power demand of the second subsystem is at least close to a lowest value during operating the wind turbine in the normal operating mode.

Further, the amount of electric power flowing through the internal electric power distribution system to the first subsystem may even be increased to a value which is at least close to, e.g. larger than 80% or even 90% of a (rated) maximum power output of the internal electric power distribution system, for example to (rated) total maximum power output of the internal electric power distribution system for the first and second subsystems, or even for all subsystems powered by via the internal electric power distribution system.

The second subsystem may be set into an idle mode or a standby mode prior to actively increasing the amount of electric power flowing through the internal electric power distribution system to the first subsystem.

If the power demand of the second subsystem typically operated at higher priority compared to the first subsystem is to be increased again, e.g. during further operating the wind turbine in the normal operating mode, the amount of electric power flowing through the internal electric power distribution system to the first subsystem may actively be reduced.

Accordingly, the wind turbine can respond to changed external (wind and/or grid) conditions and/or changed power set points received from a wind farm controller as desired.

Note that the control system typically knows in advance if the second subsystem is to be operated again at normal or even full power.

Accordingly, the proposed control scheme may be comparatively easy integrated into existing control.

More particular, after actively reducing the amount of electric power flowing through the internal electric power distribution system to the first subsystem, the second subsystem may be set into normal operating mode in which the second subsystem may response to at least one of a changed electrical output power request for the power conversion system, a grid event and a changed wind condition. Further, an amount of electric power that can flow through the internal electric power distribution system to the second subsystem may be actively increased.

In embodiments in which the first subsystem is powered via a first internal power grid of the internal electric power distribution system and the second subsystem is powered via a second internal power grid of the internal electric power distribution system, actively increasing the amount of electric power flowing through the internal electric power distribution system to the first subsystem may include diverting or redistributing electric power from the second internal power grid of the internal electric power distribution system to the first internal power grid of the internal electric power distribution system. This may include converting the diverted or redistributed electric power, for example changing from a voltage level of the second internal power grid to a different voltage of the first internal power grid.

Alternatively, electric power from the second internal power grid may be diverted/redistributed to the first subsystem via a connectable/switchable branch of the second internal power grid.

For example, a part of the resistors of a heating system (as first subsystem) may be supplied from the first internal power grid, and another part of the resistors may be supplied a connectable/switchable branch of the second internal power grid.

According to embodiments, the amount of electric power flowing through the internal electric power distribution system to the first subsystem may be increased or further increased if, in addition, a power demand of a third subsystem of the wind turbine is at least reduced during operating the wind turbine in the normal operating mode, typically also at least close to a respective lowest value during operating the wind turbine (in the normal operating mode).

Typically, the third subsystem is also operated at a higher priority compared to the first subsystem.

For example, the third subsystem of the wind turbine may include or be a yaw system of the wind turbine. Similar as explained above for pitching, yawing may only be done from time to time during normal operation, in particular when the wind direction changes.

Alternatively, the second subsystem is provided by the wind turbines yaw system, and the third subsystem is provided by the wind turbines pitch system.

Alternatively, at least one of the second subsystem and the third subsystem may be provided by a hydraulic system of system of the wind turbine.

Furthermore, the wind turbine may include several (two or) subsystems from which power may be redistributed to the first subsystem as explained above for the second subsystem and the third subsystem.

Even further, the first subsystem may also include or be provided by a heating and/or cooling system for another component of the wind turbine, for example for a generator, a converter and/or a transformer of the respective power conversion system.

In one aspect, the present disclosure is directed to a method for operating a wind turbine. The wind turbine includes a rotor including rotor blades, a power conversion system mechanically connected with the rotor, a first subsystem, a second subsystem, and an internal electric power distribution system connectable with the first subsystem and the second subsystem for supplying the first subsystem with (electric power up to) a first rated electric power and the second subsystem with (electric power up to) a second rated electric power. The method includes: determining that an active operation of the second subsystem is currently not desired for operating the wind turbine in a normal operating mode in which the power conversion system converts input motive power into electrical output power, and diverting an amount of electric power corresponding to at least a portion of the second rated electric power through the internal electric power distribution system to the first subsystem at most until the active operation of the second subsystem is again desired for operating the wind turbine (in the normal operating mode).

As the second subsystem is typically operated at higher priority compared to the first subsystem, at least in the normal operating mode, diverting electric of the power may be stopped if active operating the second subsystem is again desired. Diverting electric of the power may also be stopped if the first subsystem such a blade heating subsystem no longer has a power demand, in particular an increased power demand, and/or may be set into an idle mode or even stopped.

In another aspect, the present disclosure is directed to a wind turbine including a rotor comprising rotor blades, and a power conversion system mechanically connected with the rotor, electrically connectable to a utility grid, and configured to convert input motive power into electrical output power, The wind turbine further includes a first subsystem, a second subsystem, an internal electric power distribution system connectable with the first subsystem and the second subsystem, and a control system communicatively coupled with the power conversion system, the first subsystem, and the second subsystem. The control system is typically implemented as a controller, in particular a wind turbine controller and/or has access to and/or includes one or more processors and a non-transitory computer-readable storage medium including instructions, when executed by at least of the a one or more processors, cause the wind turbine to carry out the methods as explained herein.

In yet another aspect, the present disclosure is directed to a computer program product or a non-transitory computer-readable storage medium comprising instructions which, when executed by one or more processors of a system, in particular a wind turbine having a control system providing the one or more processors as explained herein, cause the system to carry out the methods as explained herein.

In another aspect, the present disclosure is directed to a wind turbine including a rotor comprising rotor blades, and a power conversion system mechanically connected with the rotor, electrically connectable to a utility grid, and configured to convert input motive power into electrical output power, The wind turbine further includes a first subsystem, a second subsystem, an internal electric power distribution system connectable with the first subsystem and the second subsystem, and a control system communicatively coupled with the power conversion system, the first subsystem, and the second subsystem. During operating the wind turbine in a normal operating mode in which the power conversion system converts input motive power into electrical output power, the control system is configured to detect an increased power demand of the first subsystem, and to increase an amount of electric power flowing through the internal electric power distribution system to the first subsystem if a power demand of the second subsystem is at least reduced.

Typically, the power conversion system is connectable with the internal electric power distribution system.

Accordingly, the increased amount electric power may flow from the power conversion system, through the internal electric power distribution system, and to the first subsystem.

The internal electric power distribution system may include a first internal power grid connectable with the first subsystem, for example a first internal power grid which is operable at a first voltage, in particular at an output voltage of the power conversion system.

Further, the internal electric power distribution system may include a second internal power grid connectable with at least one of the second subsystem and the third subsystem.

Typically, the second internal power grid is operable at a second voltage different to, more typically lower than the first voltage.

The internal electric power distribution system may include a voltage (power) converter, in particular a voltage transformer for converting a voltage level between the first internal power grid and the second internal power grid.

Further, the internal electric power distribution system may include a slip ring for electrically connecting respective a parts of the first internal power grid and the second internal power grid arranged in a nacelle of the wind turbine and the rotor, respectively.

Typically, the second subsystem is, compared to the first subsystem and at least in the normal operating mode, operated (by the control system) at a higher priority and/or with a shorter desired response time.

The first and second subsystem are typically at least in part arranged and/or provided by the rotor of the wind turbine.

The first subsystem may include a heating system for the rotor blades.

The heating system for the rotor blades may include at least one of a first heating loop connectable with the first internal power grid and a second heating loop connectable with the second internal power grid.

The second subsystem may include a pitch system for the rotor blades.

The wind turbine may further include a third subsystem, and the control system may be configured to increase (or further increase) the amount of electric power flowing through the internal electric power distribution system to the first subsystem if a power demand of the third subsystem of the wind turbine is at least reduced during operating the wind turbine in the normal operating mode.

Typically, the third subsystem is, compared to the first subsystem and at least in the normal operating mode, also operated (by the control system) at a higher priority and/or with a shorter desired response time.

The third subsystem may be or may be not arranged in the rotor.

In particular, the third subsystem may include or be provided by a yaw system of the wind turbine.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Reference now will be made in detail to embodiments of the invention, one or more examples of which are illustrated in the drawings. Each example is provided by way of explanation of the invention, which shall not limit the invention. In fact, it will be apparent to those skilled in the art that various modifications and variations can be made in the present invention without departing from the scope or spirit of the invention, for instance, features illustrated or described as part of one embodiment can be used with another embodiment to yield a still further embodiment. Thus, it is intended that the present invention covers such modifications and variations as come within the scope of the appended claims and their equivalents.

Figure 1:
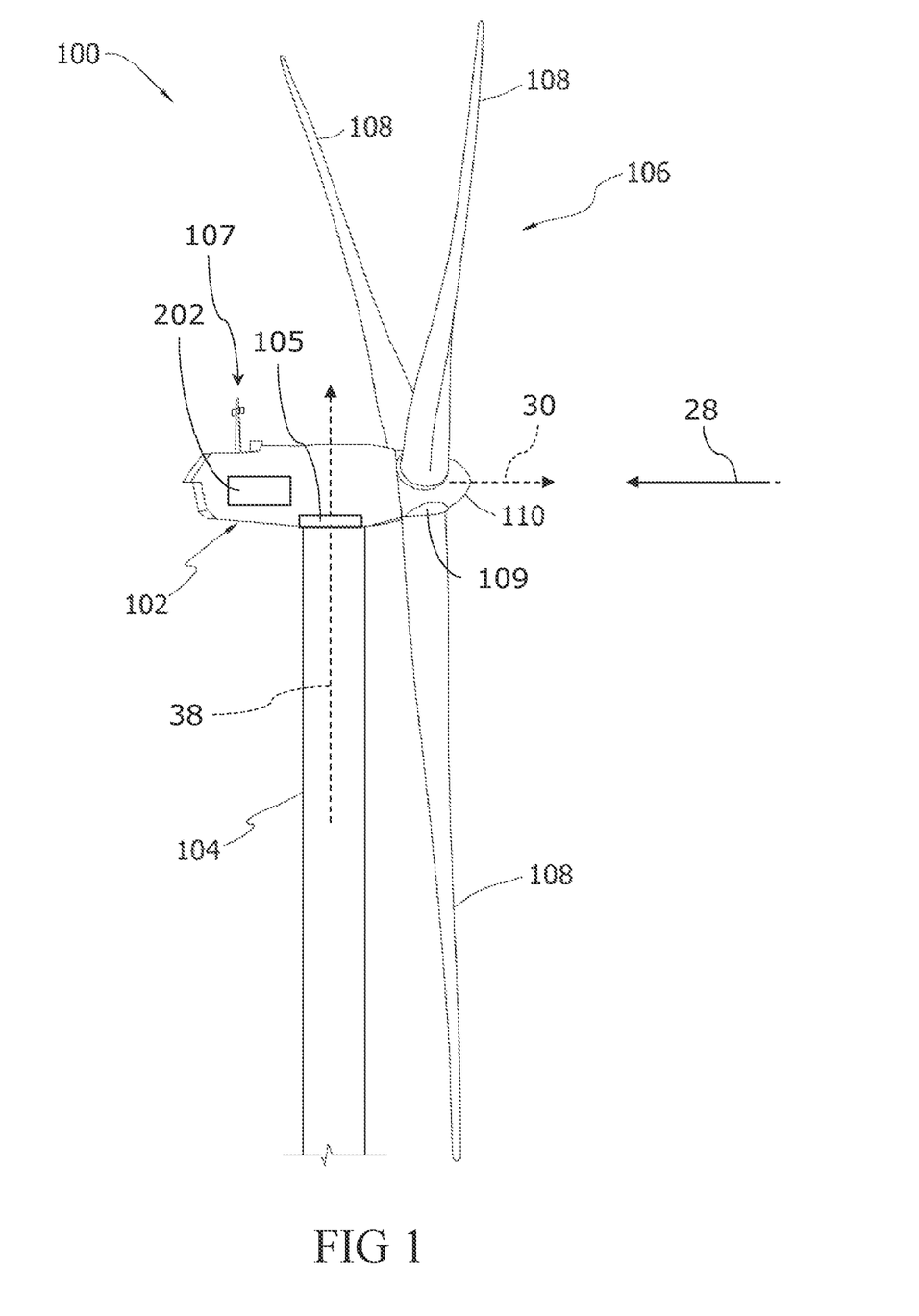
FIG. 1 illustrates a perspective view of one embodiment of a wind turbine according to the present disclosure.

FIG. 1 is a perspective view of a portion of an exemplary wind turbine 100. In the exemplary embodiment, the wind turbine 100 is a horizontal-axis wind turbine. Alternatively, the wind turbine 100 may be a vertical-axis wind turbine. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

The rotor blades 108 are spaced about the hub 110 to facilitate rotating the rotor 106 to enable kinetic energy to be transferred from the wind into usable mechanical energy, and subsequently, electrical energy.

In one embodiment, the rotor blades 108 have a length ranging from about 15 meters (m) to about 91 m. Alternatively, rotor blades 108 may have any suitable length that enables the wind turbine 100 to function as described herein. For example, other non-limiting examples of blade lengths include 20 m or less, 37 m, 48.7 m, 50.2 m, 52.2 m or a length that is greater than 91 m. As wind strikes the rotor blades 100 from a wind direction 28, the rotor 106 is rotated about an axis of rotation 30. As the rotor blades 108 are rotated and subjected to centrifugal forces, the rotor blades 108 are also subjected to various forces and moments. As such, the rotor blades 108 may deflect and/or rotate from a neutral, or non-deflected, position to a deflected position.

Moreover, a pitch angle of the rotor blades 100, i.e., an angle that determines a perspective of the rotor blades 100 with respect to the wind direction, may be changed by a pitch system 109 to control the load and power generated by the wind turbine 100 by adjusting an angular position of at least one rotor blade 108 relative to wind vectors. During operation of the wind turbine 100, the pitch system 109 may change a pitch angle of the rotor blades 109 such that the rotor blades 109 are moved to a feathered position, such that the perspective of at least one rotor blade 100 relative to wind vectors provides a minimal surface area of the rotor blade 100 to be oriented towards the wind vectors, which facilitates reducing a rotational speed and/or facilitates a stall of the rotor 18.

A blade pitch of each rotor blade 108 may be controlled individually by a wind turbine controller 202 or by a pitch control system. Alternatively, the blade pitch for all rotor blades 108 may be controlled simultaneously by said control systems.

Further, in the exemplary embodiment, as the wind direction 28 changes, a yaw direction of the nacelle 102 may be rotated, by a yaw system 105, about a yaw axis 38 to position the rotor 106 with respect to wind direction 28.

The yaw system 105 may include a yaw drive mechanism provided by nacelle 102.

Further, yaw system 105 may also be controlled by wind turbine controller 107.

Figure 2:
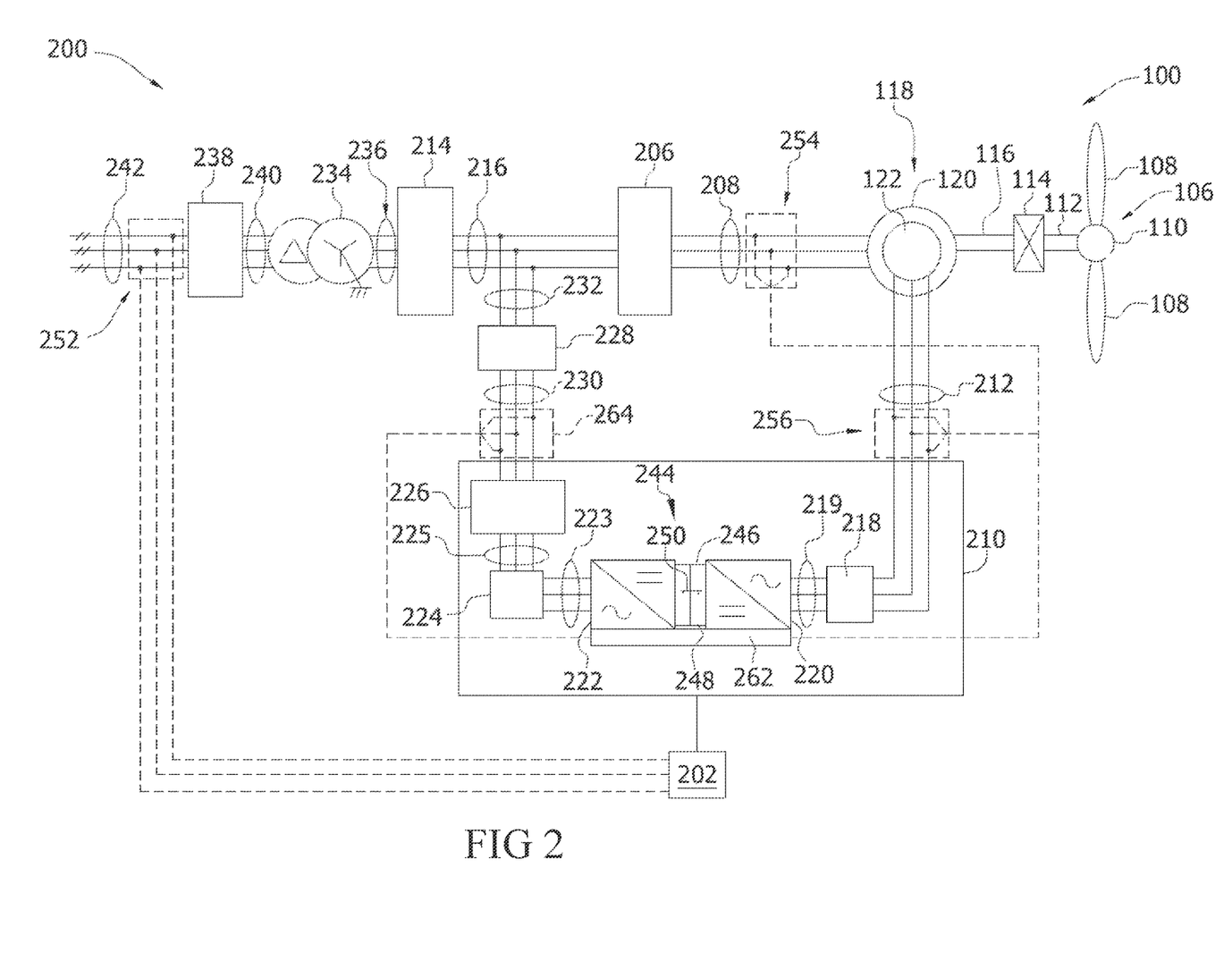
FIG. 2 illustrates a schematic view of one embodiment of an electrical power system and a control system suitable for use with the wind turbine shown in FIG. 1.

For positioning nacelle 102 appropriately with respect to the wind direction 28, the nacelle 102 may also include at least one meteorological mast 107 that may include a wind vane and anemometer (neither shown in FIG. 2). The mast 107 may provide information to the wind turbine controller 202 regarding ambient conditions. This may include wind direction and/or wind speed as well as ambient temperature, ambient moisture, precipitation type and/or amount (if any).

In the exemplary embodiment, the wind turbine controller 102 is shown as being centralized within the nacelle 102, however, the wind turbine controller may also be a distributed system throughout the wind turbine 100, on a support system (not shown in FIG. 1), within a wind farm, and/or at a remote control center. The wind turbine controller 102 includes a processor configured to perform the methods and/or steps described herein.

Referring now to FIG. 2, a schematic view of one embodiment of an electrical (power) and control system 200 that may be used with the wind turbine 100 is illustrated. During operation, wind impacts the blades 108 and the blades 108 transform wind energy into a mechanical rotational torque that rotatably drives a low-speed shaft 112 via the hub 110.

In the exemplary embodiment, the low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical power and control system 200 may include a wind turbine controller 202 configured to control any of the components of the wind turbine 100 and/or implement any of the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module to facilitate communications between the controller 202 and the various components of the wind turbine 100, e.g. any of the components of FIG. 2.

Figure 3:
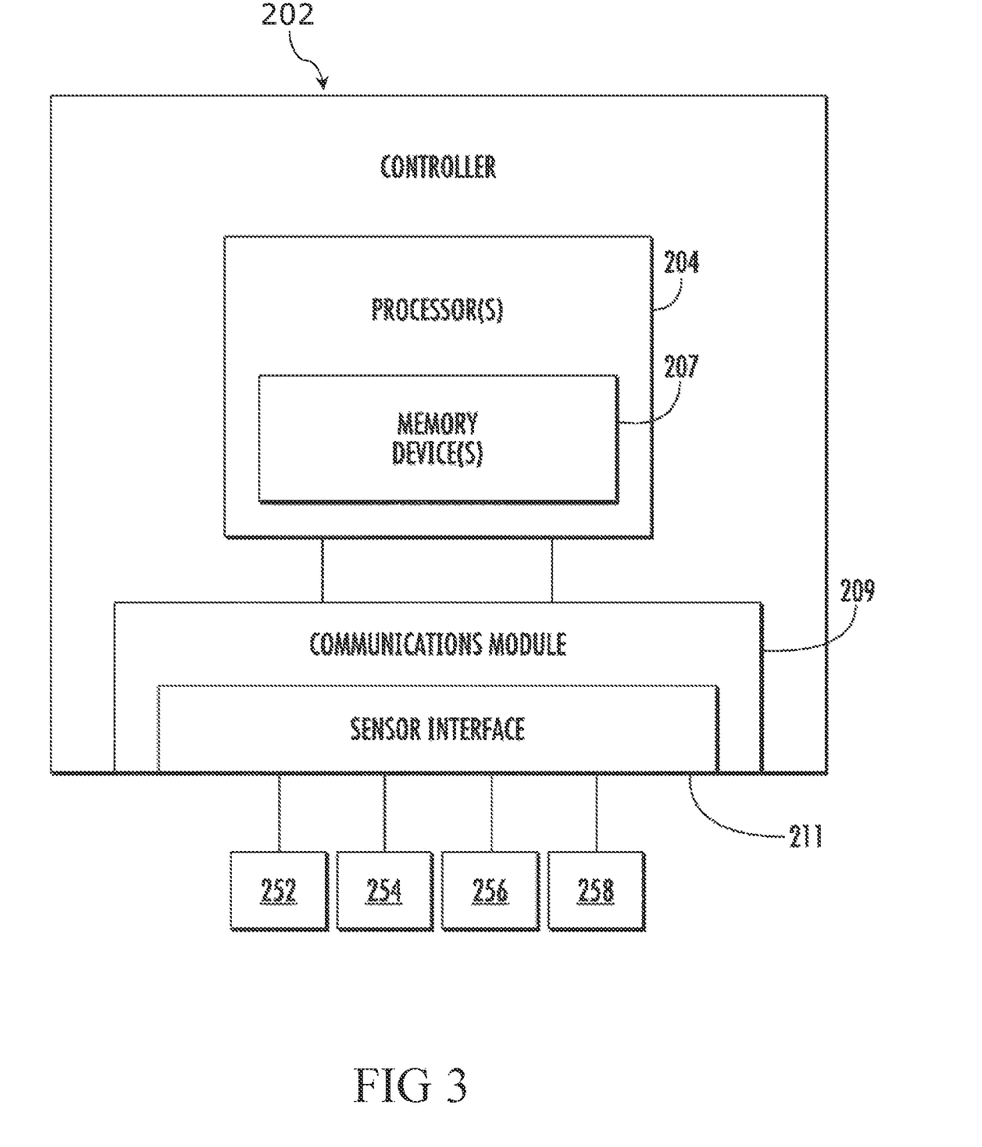
FIG. 3 illustrates a block diagram of one embodiment of a controller suitable for use with the wind turbine shown in FIG. 1.

Further, as shown in FIG. 3, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

The sensors 252, 254, 256 may be sensor for currents and/or voltages desired for controlling the power conversion of wind turbine 100. This is explained in more detail below.

Further, at least one sensor 258 may be provided for sensor data referring to meteorological data, e.g. sensor(s) provided by the meteorological mast 107 shown in FIG. 1, and/or refer to sensors data allowing for monitoring and/or evaluating icing conditions of the rotor blades.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Accordingly, a current frequency of the grid may be determined by controller 202. Alternatively or in addition, turbine controller 202 may be functionally coupled with a frequency sensor connectable with the grid. Further, it is possible that controller 202 receives the current frequency of the grid or at least a signal representative for the current frequency of the grid via primary plant controller such as a wind farm controller functionally coupled with a respective sensor.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. In the exemplary embodiment, the associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, generator 118, power conversion assembly 210 electrically coupled to generator 118 and step-up transformer 234 form the power conversion system of wind turbine 100.

Figure 4A:
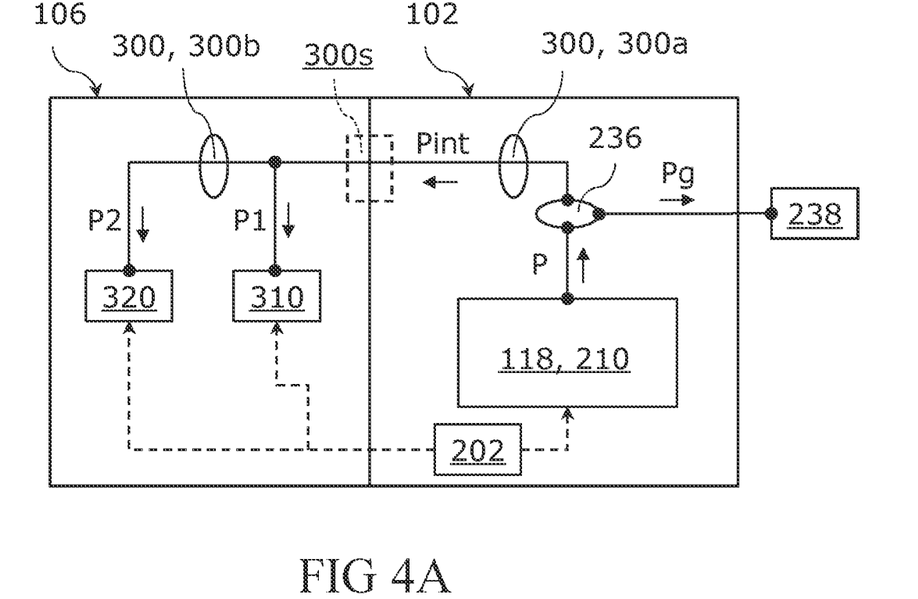
FIG. 4A illustrates a block diagram of one embodiment of a wind turbine according to the present disclosure.

FIG. 4A illustrates a block diagram of a wind turbine 100a. Wind turbine 100a is typically similar to wind turbine 100 explained above with regard to FIG. 1 to FIG. 3 and also has a nacelle 100, a rotor 106 with one or more rotor blades which is mounted rotatably with respect to nacelle 106, and a power conversion system 118, 210 mechanically connected with the rotor 106 and electrically connectable via a grid circuit breaker 238 with a utility grid for feeding electrical output power to the utility grid.

As illustrated in FIG. 4A, power conversion system 118, 210 may include a generator 118 having a generator rotor mechanically connected with rotor 106. The generator and the power conversion system assembly 210 may be electrically connectable via a as generator side bus 236 and other components as shown in FIG. 2, in particular a grid circuit breaker 238 with the utility grid. More particular, wind turbine 100a may include a DFIG-power conversion system.

In the exemplary embodiment, a first subsystem 310 and a second subsystem 320 of rotor 106 are connected via an internal electric power distribution system 300 with generator side bus 236 and power output lines of power conversion system assembly 210, respectively, for power supply.

As illustrated in FIG. 4A by dashed arrows, a wind turbine controller 202 is typically communicatively coupled via a data bus and/or respective data lines with the power conversion system 118, 210, the first subsystem 310 and the second subsystem 320 and configured to control the components 118, 210, 310, 320.

During normal operating mode, the power conversion system 118, 210 converts input motive power into electrical output power P. Typically a main portion Pg of electrical output power P is fed to the utility grid in the normal operating mode. A typically comparatively small portion Pint (Pint=P−Pg) of output power P, e.g. up to a few percent, may be used for internal power supply of subsystems 310, 320 (see also the small arrows in FIG. 4A).

According to an embodiment, wind turbine controller 202 is configured detect an increased power demand of the first subsystem 310, and increase an amount of electric power P1 flowing through the internal electric power distribution system to the first subsystem 310 at the expense of an amount of electric power P2 flowing through the internal electric power distribution system to the second subsystem 320, if a power demand of the second subsystem 320 is (currently) at least reduced (e.g. compared to/lower than a rated power demand and/or an expected power demand for an active operation of the second subsystem).

In other words, at least a part of the electric power P2 may be redistributed to the first subsystem, and a balance between electric power P1 and electric power P2 may be adapted, respectively (Pint=P1+P2) if desired.

Thus, the power supply capacity of first subsystem 310 may be increased at least without substantially changing the hardware of wind turbine 100a.

This is facilitated by dynamically (real time, or near real time) diverting/redistributing of some or even all unutilized power P2 of second subsystem 320.

Typically, the first subsystem 310 is a heating system for the rotor blades and the second system is or at least includes a pitch system for the rotor blades.

Accordingly, the heating system for the rotor blades may additionally use a substantial amount of power for deicing and/or protection against deicing in time intervals in which pitching is not required. For example, the blade deicing (heating) system may thus use at least 5% or even at least 10% in addition.

Accordingly, deicing time may be reduced and the overall productivity of the wind turbine improved (under cold conditions).

As illustrated in FIG. 4A, the exemplary internal electric power distribution system includes a slip ring 300s for electrically connecting a part 300a of the internal power grid 300 arranged in nacelle 102 of the wind turbine and a part 300b of the internal power grid 300 arranged in rotor 106.

Figure 4B:
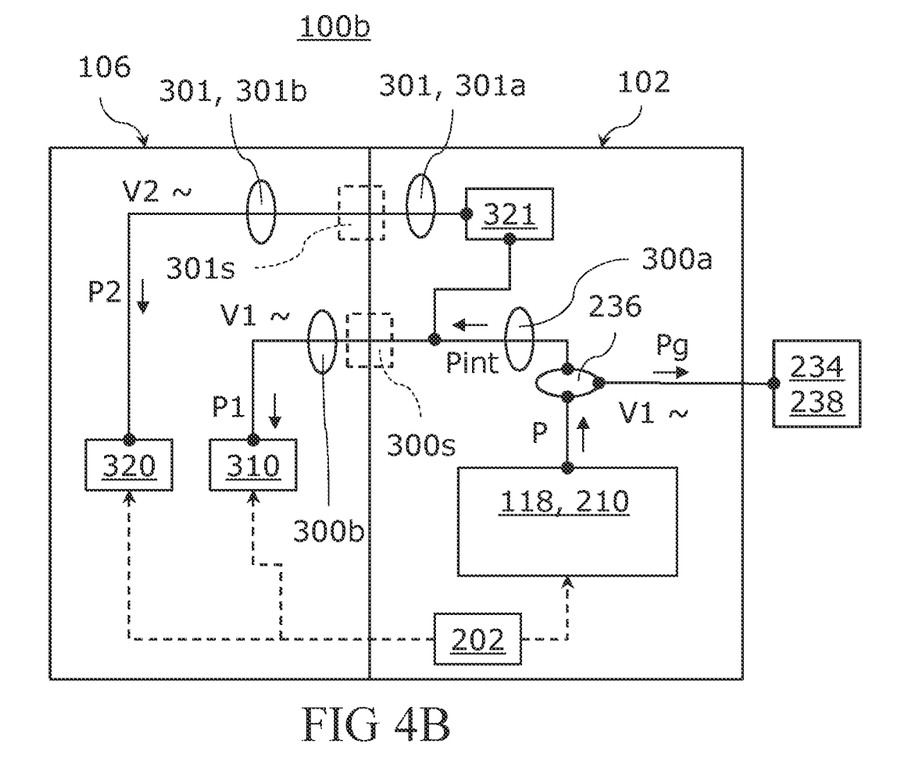
FIG. 4B illustrates a block diagram of one embodiment of a wind turbine according to the present disclosure.

FIG. 4B illustrates a block diagram of a wind turbine 100b. Wind turbine 100b is typically similar to wind turbine 100a explained above with regard to FIG. 4A. Wind turbine 100b is typically also electrically connectable via a grid circuit breaker 238 and an electric power main transformer 234 coupled between the generator-side bus and the grid circuit breaker 238 with a utility grid for feeding electrical output power to a utility grid.

However, the first and second subsystem 310, 320 are supplied by internal grids operating at different AC-voltages V1, V2.

More particular, the exemplary internal electric power distribution system of wind turbine 100b has a first internal power grid 300, 300a, 300b connectable with the first subsystem 310 and operable at a first voltage V1, in particular at an output voltage of the power conversion system 118, 210 of e.g. 690 V, and a second internal power grid 301, 301a, 301b connectable with the second subsystem 310 and operable at a second voltage V2 which is typically lower than the first voltage V1. In one example, the second voltage is about 400V.

For this purpose, the internal electric power distribution system typically includes a voltage converter 321 such as a (an additional) voltage transformer for converting the voltage level between the first internal power grid and the second internal power grid.

Further, the exemplary internal electric power distribution system of wind turbine 100b includes respective slip rings 300s, 301a for electrically connecting parts 300a, 300b of the first internal power grid 300 and parts 301a, 301b of the second internal power grid 301 of wind turbine 100b, respectively.

Figure 5A:
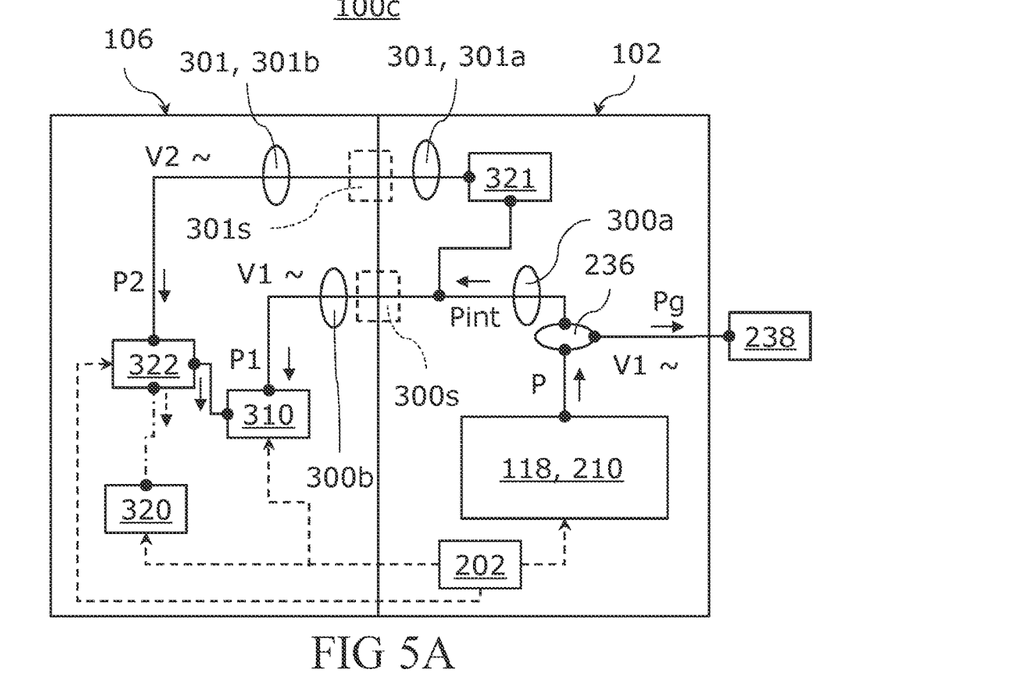
FIG. 5A illustrates a block diagram of one embodiment of a wind turbine according to the present disclosure.

FIG. 5A illustrates a block diagram of a wind turbine 100c. Wind turbine 100c is typically similar to wind turbine 100b explained above with regard to FIG. 4B. However, wind turbine 100b additionally includes a switch 322 which is controllable by turbine controller 202.

Accordingly, power P2 temporarily not required for supplying the second subsystem 320, in particular a respective pitch system, may be in part or even completely be redistributed to/used in addition for power supply of the first subsystem 310, e.g. a rotor blade deicing system, in particular a rotor blade heating system.

Power D2 may be redistributed to the first subsystem 310 even without further voltage conversion. For example, different parts (e.g. heating resistors or blowers) of the blade heating system may by supplied with electric power of the two voltages V1, V2.

Figure 5B:
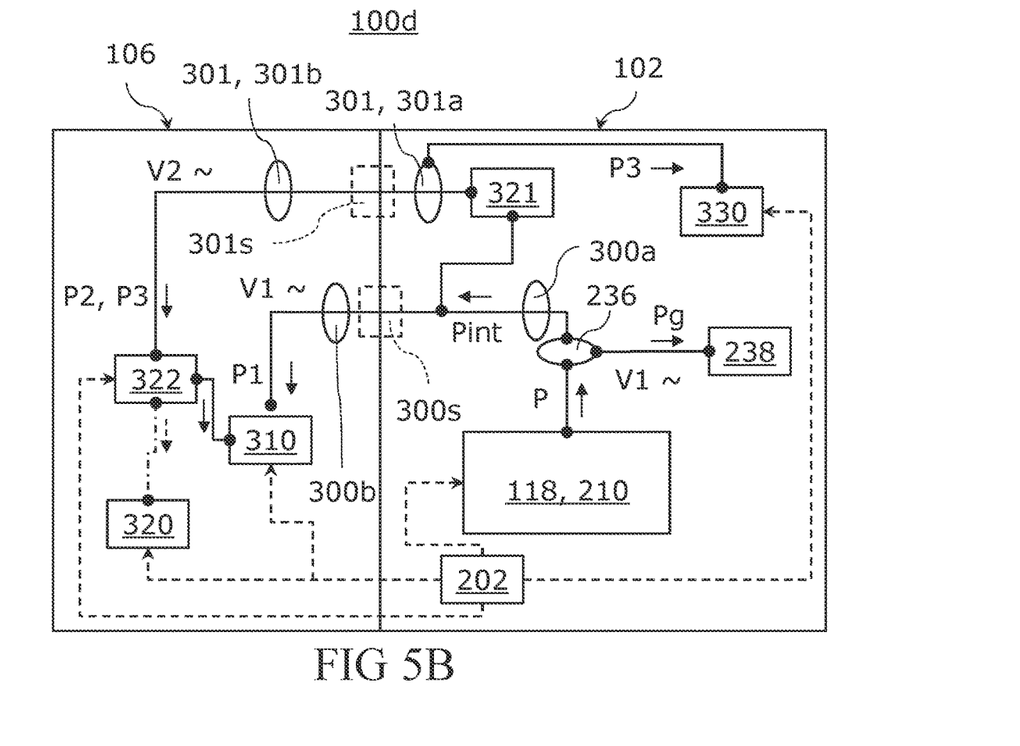
FIG. 5B illustrates a block diagram of one embodiment of a wind turbine according to the present disclosure.

FIG. 5B illustrates a block diagram of wind turbine 100d. Wind turbine 100d is typically similar to wind turbine 100c explained above with regard to FIG. 4A. However, wind turbine 100d additionally includes a third subsystem 330 which is controllable by turbine controller 202, In the exemplary embodiment, third subsystem 330 is implemented as a yaw system of wind turbine 100d. The yaw system 320 is controllable by turbine controller 202 and typically arranged at least in part in nacelle 102.

In the exemplary embodiment, a total power P2+P3 temporarily not required for supplying the second subsystem 320 and the third subsystem 320 may be in part or even completely be redistributed/used for the first subsystem 310, e.g. a blade heating system 310.

Thus, an even larger fraction of power may be redistributed to the first subsystem even without affecting normal operating the wind turbine.

Figure 6A:
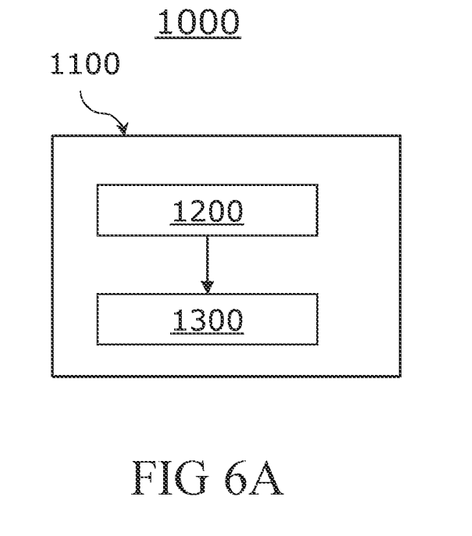
FIG. 6A illustrates a flow chart of a method according to an embodiment of the present disclosure.

FIG. 6A illustrates a flow chart of a method 1000 of operating a wind turbine, in particular a wind turbine 100-100d as explained above with regard to FIG. 1 to FIG. 5B. As such the wind turbine has a power conversion system mechanically connected with the rotor, a first subsystem, a second subsystem, and an internal electric power distribution system for supplying the first subsystem and the second subsystem with electric power.

During operating 1100 the wind turbine in a normal operating mode, in which the power conversion system converts input motive power received from the rotor into electrical output power and provides a least a major portion of the electrical output power to a utility grid, method 1000 includes the step (block) 1200 of detecting an increased power demand of the first subsystem.

Thereafter, an amount of electric power flowing through the internal electric power distribution system to the first subsystem may be increased if a power demand of the second subsystem is at least reduced, in a subsequent block 1300.

Figure 6B:
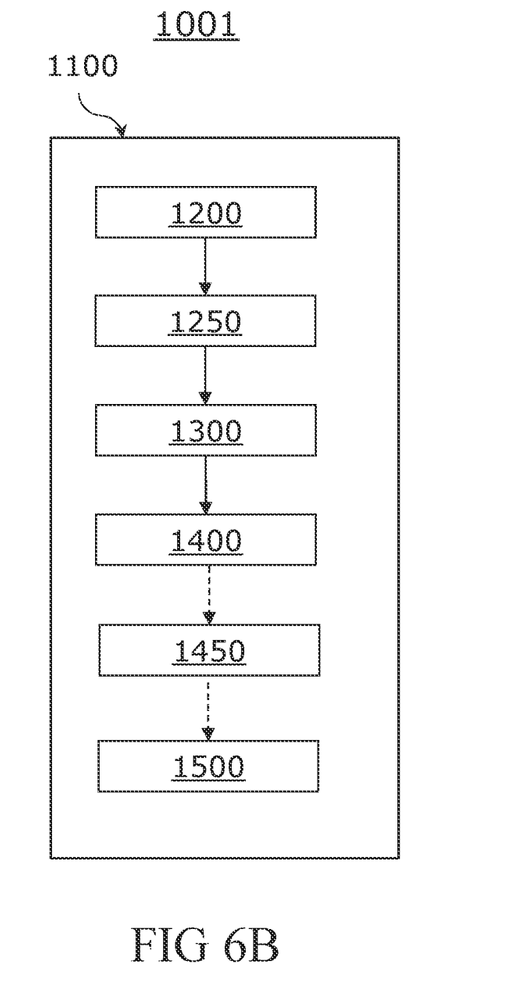
FIG. 6B illustrates a flow chart of a method according to an embodiment of the present disclosure.

FIG. 6B illustrates a flow chart of a method 1001 of operating a wind turbine, in particular a wind turbine 100-100d as explained above with regard to FIG. 1 to FIG. 5B. Method 1001 is typically similar to method 1000 explained above with regard to FIG. 6A and also includes a block 1200 of detecting an increased power demand of a first subsystem and a block 1300 of actively increasing the amount of electric power flowing through the internal electric power distribution.

However, between blocks 1200, 1300, a further block 1250 in which the second subsystem is set into an idle mode or a standby mode is provided.

Between blocks 1200, 1250, yet a further block of actively reducing a power demand of the second subsystem or detecting a reduced power demand of the second subsystem may be provided.

After block 1300, the amount of electric power flowing through the internal electric power distribution system to the first subsystem may be actively reduced in a block 1400, if the power demand of the second subsystem is to be increased again during operating the wind turbine.

Between blocks 1300, 1400, yet a further block of detecting that the power demand of the second subsystem is to be increased again may be provided, for example due to a changed wind condition or a changed power setpoint e.g. received from a wind farm controller.

In a block 1450 subsequent to block 1400, an amount of electric power that can flow through the internal electric power distribution system to the second subsystem may be actively increased.

Thereafter, the second subsystem may be set back to a normal operating mode in a subsequent block 1500.

Figure 6C:
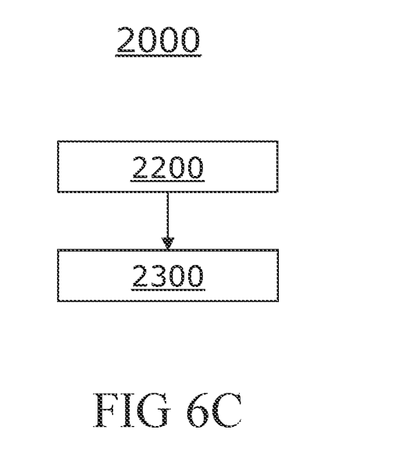
FIG. 6C illustrates a flow chart of a method according to an embodiment of the present disclosure.

FIG. 6C illustrates a flow chart of a method 2000 of operating a wind turbine, in particular a wind turbine 100-100d as explained above with regard to FIG. 1 to FIG. 5B. Accordingly, the wind turbine typically has a power conversion system mechanically connected with the rotor, a first subsystem, a second subsystem, and an internal electric power distribution system for supplying the first subsystem and the second subsystem with electric power.

During operating the wind turbine in a normal operating mode, in which the power conversion system converts input motive power received from the rotor into electrical output power and provides a least a major portion of the electrical output power to a utility grid.

In a first block 2200, method 2000 may include determining that an active operation of the second subsystem is currently not desired for operating the wind turbine in a normal operating mode in which the power conversion system converts input motive power into electrical output power.

Thereafter, an amount of electric power corresponding to at least a portion of the second rated electric power may be redistributed through the internal electric power distribution system to the first subsystem at most until the active operation of the second subsystem is again desired for operating the wind turbine, in a block 2300.

Exemplary embodiments of wind turbines and methods for operating wind turbines are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) 204 discussed above with reference to FIG. 3, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) 204 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation: the number or type of embodiments described in the specification.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. For example, at least one of the subsystems may at least partly be located in the tower or a base instead of the rotor and the nacelle, respectively, such an air conditioning unit for the main transformer. Such other examples are intended to be within the scope of the claims if they have structural elements that do not differ from the literal language of the claims, or if they include equivalent structural elements with insubstantial differences from the literal language of the claims.

REFERENCE NUMBERS wind turbine 100-100d
nacelle 102
tower 104
yaw system 105
rotor 106
meteorological mast 107
blades 108
pitch system 109
hub 110
low speed shaft 112
gearbox 114
generator 118
generator stator 120
generator rotor 122
control system 200
turbine controller 202
processor 204
synchronizing switch 206
memory 207
stator bus 208
communications module 209
power conversion assembly 210
sensor interface 211
rotor bus 212
transformer circuit breaker 214
system bus 216
rotor filter 218
filter bus 219
rotor-side power converter 220
line side power converter 222
line side power converter bus 223
line filter 224
line bus 225
line contactor 226
conversion circuit breaker 228
conversion circuit breaker bus 230
connection bus 232
electric power main transformer 234
generator-side bus 236
grid circuit breaker 238
breaker-side bus 240
distribution grid via a grid bus 242
DC link 244
positive rail 246
negative rail 248
capacitor 250
electric current sensors 252
electric current sensors 254
electric current sensors 256
converter controller 262
electric current sensors 264
(first) internal grid 300, 300a, 300b
second internal grid 301, 301a, 301b
slip ring 300s, 301s
first subsystem 310
second subsystem 320
third subsystem 330
method, method steps 1000-2300

The invention claimed is:

1. A method for operating a wind turbine, wherein the wind turbine includes:
a rotor with rotor blades;
a power conversion system mechanically connected with the rotor;
a first subsystem, and a second subsystem;
an internal electric power distribution system connectable with the first subsystem and the second subsystem;
the method comprising:
operating the wind turbine in a normal operating mode in which the power conversion system converts input motive power into electrical output power supplied to a utility grid;
during the operation in the normal operating mode, detecting an increased power demand of the first subsystem;
actively increasing an amount of electric power flowing through the internal electric power distribution system to the first subsystem when a current power demand of the second subsystem is reduced from a rated power demand of the second subsystem or a power demand needed for an active expected operation of the second subsystem; and
continuing to operate the wind turbine in the normal operating mode with the reduced power demand of the second subsystem.

2. The method of claim 1 wherein the first subsystem comprises a heating system for the rotor blades and the increased power demand for the first subsystem is used for heating at least one of the rotor blades, and the method is only performed if an ambient temperature is below a given temperature threshold, the method further comprising monitoring an icing condition of the rotor blades and increasing the amount of electric power flowing through the internal electric power distribution system to the first subsystem only after evaluating the icing condition of the rotor blades.

3. The method of claim 1, wherein the second subsystem is operated at a higher priority compared to the first subsystem in the normal operating mode.

4. The method of claim 1, wherein the amount of electric power flowing through the internal electric power distribution system to the first subsystem is increased to a value such that the electric power flowing through the internal electric power distribution system is at a maximum value.

5. The method of claim 1, further comprising:
setting the second subsystem into an idle mode or a standby mode prior to actively increasing the amount of electric power flowing through the internal electric power distribution system to the first subsystem; and
actively reducing the amount of electric power flowing through the internal electric power distribution system to the first subsystem if the power demand of the second subsystem is to be increased for the expected operation of second subsystem during operation of the wind turbine in the normal operating mode.

6. The method of claim 5, after actively reducing the amount of electric power flowing through the internal electric power distribution system to the first subsystem, further comprising:
   actively increasing an amount of electric power flowing through the internal electric power distribution system to the second subsystem;
   setting the second subsystem into a normal subsystem operating mode; and
   operating the second subsystem in response to at least one of a changed electrical output power request for the power conversion system or a changed wind condition.

7. The method of claim 1, wherein the amount of electric power flowing through the internal electric power distribution system to the first subsystem is actively increased if a power demand of a third subsystem of the wind turbine is reduced during operating the wind turbine in the normal operating mode, and wherein the third subsystem is operated at a higher priority compared to the first subsystem in the normal operating mode.

8. The method of claim 1, wherein actively increasing the amount of electric power flowing through the internal electric power distribution system to the first subsystem comprises:
   diverting electric power from a second internal power grid of the internal electric power distribution system to a first internal power grid of the internal electric power distribution system.

9. A wind turbine, comprising:
   a rotor with rotor blades;
   a power conversion system mechanically connected with the rotor;
   a first subsystem, and a second subsystem;
   an internal electric power distribution system connectable with the first subsystem and the second subsystem;
   a control system communicatively coupled with the power conversion system, the first subsystem, and the second subsystem, the control system configured to perform the following:
      operate the wind turbine in a normal operating mode in which the power conversion system converts input motive power into electrical output power supplied to a utility grid;
      during the operation in the normal operating mode, detect an increased power demand of the first subsystem;
      actively increase an amount of electric power flowing through the internal electric power distribution system to the first subsystem when a current power demand of the second subsystem is reduced from a rated power demand of the second subsystem or a power demand needed for an active expected operation of the second subsystem; and
      continue to operate the wind turbine in the normal operating mode with the reduced power demand of the second subsystem.

10. The wind turbine of claim 9, wherein:
   the power conversion system is connectable with the internal electric power distribution system;
   the internal electric power distribution system comprises a first internal power grid connectable with the first subsystem and operable at a first voltage and a second internal power grid connectable with the second subsystem and a third subsystem, the second internal power grid operable at a second voltage lower than the first voltage;
   the internal electric power distribution system comprising a voltage converter that converts a voltage level between the first internal power grid and the second internal power grid; and
   the internal electric power distribution system comprising a slip ring for electrically connecting respective parts of the first internal power grid and the second internal power grid arranged in a nacelle of the wind turbine and the rotor, respectively.

11. The wind turbine of claim 10, wherein in the normal operating mode, the second subsystem comprises a higher operating priority than the first subsystem and a shorter desired response time than the first subsystem, the first subsystem comprising a heating system for the rotor blades, and the second subsystem comprising a pitch system.

12. The wind turbine of claim 11, wherein the heating system comprises a first heating loop connectable with the first internal power grid and operable at the first voltage of the first internal power grid, and a second heating loop connectable with the second internal power grid and operable at the second voltage of the second internal power grid.

13. The wind turbine of claim 9, further comprising a third subsystem, the control system configured to increase the amount of electric power flowing through the internal electric power distribution system to the first subsystem if a power demand of the third subsystem of the wind turbine is reduced during operation of the wind turbine in the normal operating mode.

* * * * *